UNITED STATES PATENT OFFICE.

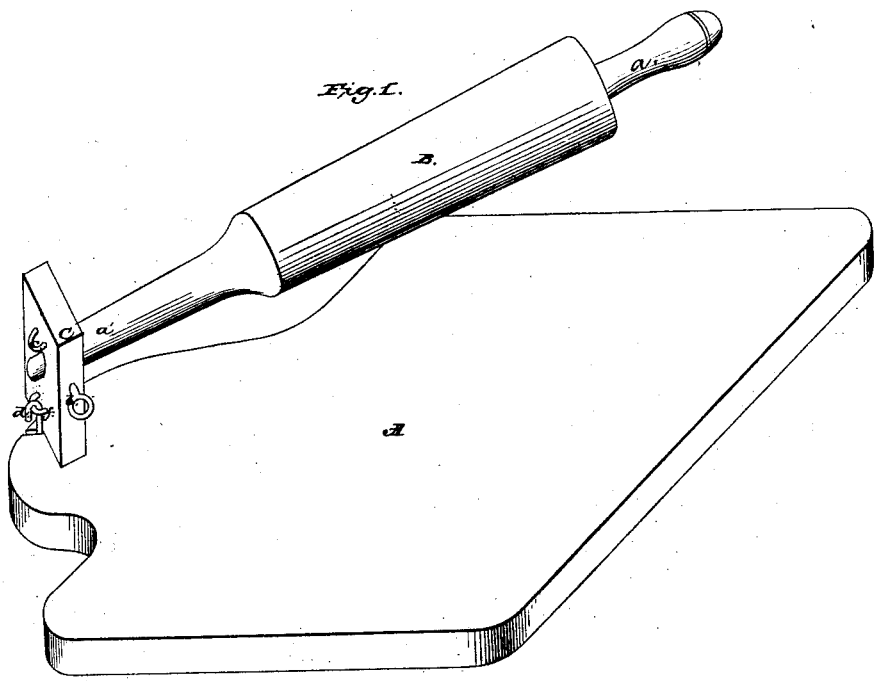
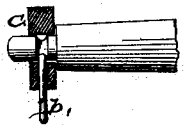

GEORGE W. SANDERS, OF SPRINGFIELD, VERMONT.

IMPROVED DOUGH-KNEADER.

Specification forming part of Letters Patent No. 55,718, dated June 19, 1866.

*To all whom it may concern:*

Be it known that I, GEORGE W. SANDERS, of Springfield, in the county of Windsor and State of Vermont, have invented a new and Improved Apparatus for Kneading Dough; and I do hereby declare that the following is a full, clear, and exact description thereof, which will enable others skilled in the art to make and use the same, reference being had to the accompanying drawings, forming a part of this specification, in which—

Figure 1 is a perspective view of my invention. Fig. 2 is a sectional view taken on the line $x\ x$, Fig. 1.

Similar letters of reference indicate like parts.

My invention consists in combining a kneading-board and roller in such manner that the roller may have a universal motion, whereby I produce a convenient and easily-operated device for kneading dough.

A designates the kneading or molding board, which may be of any appropriate size or shape. B is the roller, which in the present instance increases in diameter from the handle $a$ toward its other end. The other end, $a'$, of this roller is set in a block, C, it being held therein in the present instance by a pin, $b$, which penetrates the block so that its end will rest in a groove cut around the end of the roller, as shown in Fig. 2, by withdrawing which pin the roller can be disengaged from its block. The roller is by this attachment insured a revolving motion for rolling out a sheet of dough, from which to cut biscuits, cakes, &c.

The block C is secured to the kneading-board by means of staples, $c\ c$, either of which can be caught over a hook, $d$, rising from the rear end of the board A. This attachment of the roller to the block and the block to the kneading-board allows the roller to have a universal motion, and consequently it can be operated with good effect upon the dough.

What I claim as new, and desire to secure by Letters Patent, is—

The combination of the roller B with its grooved end $a'$, the block C, pin $b$, staples $c\ c$, hook $d$, and board A, arranged and operating in the manner and for the purpose herein described.

GEORGE W. SANDERS.

Witnesses:
WILLIAM H. WHEELER,
EDMUND C. BURKE.